United States Patent [19]

Larson et al.

[11] Patent Number: 4,615,485

[45] Date of Patent: Oct. 7, 1986

[54] PAINT CIRCULATION ADAPTER AND COUPLER

[75] Inventors: James H. Larson, Coon Rapids; Sheila S. McKee, St. Paul, both of Minn.

[73] Assignee: Graco Inc., Minneapolis, Minn.

[21] Appl. No.: 742,748

[22] Filed: Jun. 10, 1985

[51] Int. Cl.⁴ .......................... B05B 9/04; F16K 31/50

[52] U.S. Cl. .................................... 239/124; 137/242; 239/123; 239/127; 239/581.2; 251/215

[58] Field of Search .................... 137/605, 625.41, 862, 137/240, 238, 242; 239/76, 124, 127, 565, 580, 581, 123; 251/215, 218, 291, 221, 223, 225, 264, 274

[56] References Cited

U.S. PATENT DOCUMENTS

| | | | |
|---|---|---|---|
| 938,868 | 11/1909 | Hunter | 137/625.16 |
| 2,497,354 | 2/1950 | Hachathorn | 251/223 |
| 2,669,415 | 2/1954 | Gilroy | 251/215 |
| 2,705,663 | 4/1955 | Gilbreath | 239/583 |
| 2,958,504 | 11/1960 | Lindgren | 251/223 |
| 2,991,940 | 7/1961 | Dupler et al. | 239/125 |
| 3,255,775 | 6/1966 | Albro et al. | 251/215 |
| 3,443,789 | 5/1969 | Glasgow et al. | 251/223 |
| 3,540,660 | 11/1970 | Simon | 239/580 |
| 3,589,610 | 6/1971 | Wahlin | 239/125 |
| 3,623,661 | 11/1971 | Wagner | 239/127 |
| 3,628,727 | 12/1971 | Gjerde | 239/124 |
| 3,720,373 | 3/1973 | Levey | 239/127 |
| 3,831,845 | 8/1974 | Pacht | 239/76 |
| 4,022,381 | 5/1977 | Karliner | 239/126 |
| 4,106,699 | 8/1978 | Holt | 239/127 |

FOREIGN PATENT DOCUMENTS

| | | | |
|---|---|---|---|
| 1108402 | 1/1956 | France | 251/215 |
| 375673 | 10/1939 | Italy | 239/124 |
| 149801 | 4/1955 | Sweden | 251/215 |

*Primary Examiner*—George L. Walton
*Attorney, Agent, or Firm*—Paul L. Sjoquist

[57] ABSTRACT

A paint flow controller for insertion into a continuous flow pressure feed recirculating paint supply system where a portion of the recirculating paint is bled off through an externally adjustable, annular metering orifice for supply through a connector to a paint spray gun.

6 Claims, 3 Drawing Figures

PAINT CIRCULATION ADAPTER AND COUPLER

BACKGROUND OF THE INVENTION

The invention relates to a recirculating-type liquid flow paint system, and more particularly to an adjustable flow rate controller for regulating the quantity of paint supply to a spray gun while allowing the excess paint to be circulated through the paint recirculating system.

Recirculating-type liquid coating, or more particularly, recirculating-type paint systems are in widespread commercial use. The paint recirculating system includes a mixing tank equipped with suitable agitation means maintaining the paint uniformly mixed and a pump transferring the liquid paint under pressure to a plurality of automatic or manual spray guns. Suitable return lines are provided to return the excess paint back to the mixing tank for recyling.

At the juncture of the pressurized paint supply line and spray gun, a suitable flow control device is inserted for regulating the quantity and pressure of the paint to be supplied directly to the spray gun.

Various flow control devices or paint restrictor device have been used or proposed for use, including diaphragm-type regulators, and needle-valve regulators. Some of the prior art constructions have been handicapped by their tendency to become progressively plugged over periods of use, necessitating excessive down time for cleaning or replacement of the regulators. Additionally, some of the prior art devices are difficult to adjust the flow rate in, often requiring removal and tools to adjust.

U.S. Pat. No. 4,106,699 issued to Holt on Aug. 15, 1978 discloses a needle-valve type flow regulator which, although, embodying some needed self-cleaning features, requires stoppage of the paint flow, partial disassembly, and use of a tool to adjust flow rate.

SUMMARY OF THE INVENTION

The invention includes an elongated housing having a paint through passage suitable for connection into a recirculating paint supply system. The paint is communicated through an axial passage, across an adjustable rotary flow valve and to the paint spray gun. An adjustable rotary valve is threadedly inserted across the axial passage. The valve has a cylindrical body with a diameter substantially greater than the diameter of the paint supply passage and has a tapered inner end. When fully inserted, the cylindrical portion of the valve body transverses the axial port, occluding paint flow. When open, the tapered segment of the valve confronts the axial port and cooperates with its retaining recess and the axial port forming a variable sized annular passageway through the housing to allow a regulated flow of paint therethrough.

An object of the invention is to provide an improved externally adjustable self-cleaning paint flow controller for use in a constant flow recirculating paint supply system.

Another object of the invention is to provide an improved paint flow controller having a uniform pressure drop.

A feature of the invention is an elongated paint flow controller having an externally adjustable tapered flow controller disposed across the axial passage.

Another feature of the invention is a self-cleaning rotary valve.

Another feature of the invention is a retaining cap for preventing inadvertent movement of the flow control valve.

The principal advantage of the invention is that it provides an externally adjustable paint flow controller wherein the adjustable valve is protected, and wherein adjustments require the use of a special tool which functions as a key, thereby preventing unauthorized adjustment by people not having access to the key.

Another advantage of the invention is that movement of the rotary valve inhibits paint build up and plugging of the paint flow controller.

Another advantage of the invention is that it provides a uniform pressure drop thereby supplying the paint spray gun with paint at a uniform pressure.

DESCRIPTION OF THE PREFERRED EMBODIMENT

Figure 1:
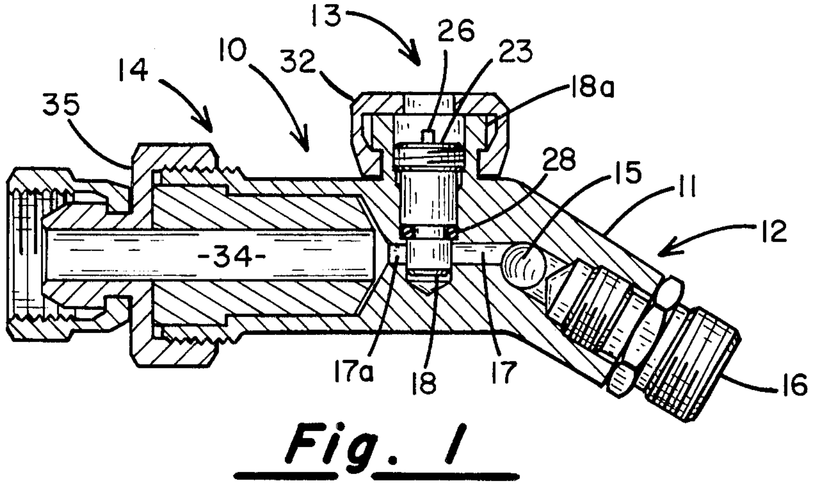
FIG. 1 is a longitudinal cross sectional view of the paint flow controller showing the paint flow controller with the valve closed.

The flow controller 10 has a unitary housing 11 and functionally divides into an inlet section 12, valving section 13, and an outlet section 14. The housing 11 may be made from plastic, ferrous, or nonferrous metals.

The inlet section 12 is offset from the outlet section 14 in an acute angle, preferably 30°, to provide more convenient attachment for the inlet fittings and connections between the paint recirculating system and the paint spray gun.

The inlet section 12 has a substantially U-shaped transfer passage 15 passing through it. The transfer passage 15 is connected into the paint recirculating system using the connection ports 16. The connection ports 16 may be attached permanently into the paint recirculating system, but, are preferably threaded to accept a conventional fitting so that the flow controller 10 may be removably inserted into the paint recirculating system. The transfer passage 15 also intersects the axial port 17 communicating the paint from the transfer passage 15 into the valving section 13.

The valving section 13 of the flow controller 10 has a central axial passage 17, **17*a* extending along its length. The axial port 17, 17*a* is orthogonally intersected by the cylindrical valve recess 18. A cylindrical, internally threaded neck 18*a* extends outwardly from the surface of the valving section 13 concentric with the valve recess 18**.

The valve recess 18 has a terminal valving diameter section 19 extending across the axial port 17, **17*a* and a concentric sealing section 20 adjacent the valving diameter section 19. The neck 18*a* also has a further counterbored threaded section 21 adjacent the sealing section 20 for receiving the threaded portion of the valve body 22**.

The valve body 22 has a head 23, a cylindrical body 24, and a valving section 25. The head 23 of the valve 22 is externally threaded to fit within the threaded section 21 of the neck **18*a*. There is a key projection 26 extending upwardly and partially across the exterior surface of the head 23 of the valve body 22**.

An annular recess is formed at the intersection of the cylindrical portion 24 and the valving section 25 of the valve body 22, and a seal ring 28 is placed in the annular recess. The seal ring 28 is made from a resilient sealing material.

The valving section 25 of the valve body 22 has a cylindrical segment 29 and a tapered segment 30. The cylindrical segment 29 has a diameter closely fitting within the valve recess 18. The tapered segment 30 tapers centrally from the cylindrical segment 29, and the taper between the cylindrical segment 29 and the tapered segment 30 is a small acute angle, preferably between 3° and 10°.

When the valve body 22 is partially withdrawn from its seated position, the tapered segment 30 confronts the axial port 17,17*a* and forms an annular flow passage 31 therebetween. The annular flow passage 31 has a variable size, dependent on the position of the tapered segment 30 in relation to the axial port 17,17*a*.

A retainer cap 32 is crimped over the exterior of neck 18*a* concentric with the valve recess 18. The retainer cap 32 has a central opening through which key projection 26 may be accessed.

The outlet section 14 extends linearly from the valving section 13. The outlet section 14 has a central outlet port 34 communicating with the axial port 17*a* and preferably having a larger diameter than the axial port 17*a*.

Spray gun adapter 35 is attached to the terminal end of the outlet section 14. The spray gun adapter 35 provides for a connection to a spray gun, and may take the form shown or several other forms. For example, the spray gun adapter may include a ckeck valve assembly and a pin or slip-ring-type quick coupler adapter to quickly and readily connect and disconnect the spray gun from the paint flow controller.

In its use flow controller 10 is connected into a recirculating paint supply system using the connection ports 16. A suitable paint spray gun is attached to the spray gun adapter 35. Pressurized paint enters through the one connection port 16 and passes through the transfer passage 15 out to the second connection port 16 for recirculation. A portion of the paint flow enters the axial port 17 and flows to the valve section 13. The axial port 17 is obstructed or partially obstructed by the cylindrical valving portion 29 of the valve body 22.

When an authorized operator opens the valve 22 by turning the key projection 26 with a tool adapted for such purpose, a variable sized annular passageway 31 is formed between the tapered segment 30 of the valve body 22 and the reduced diameter valving segment 19 of the valve recess 18. The paint is communicated from the axial passage 17 through the annular passage 31 and into the outlet axial passage 17*a*.

The annular passage 31 restricts the flow of paint therethrough regulating the quantity of paint reaching the paint spray gun.

From the outlet axial passage 17*a* the paint is communicated into the outlet port 34 to the paint spray gun.

An authorized operator may adjust the paint flow to the spray gun by simply inserting the necessary tool over key projection 26 and turning the valve body 22. When the valve body is turned into the housing as illustrated in FIG. 1, the annular passage 31 diminishes in size, thereby restricting the flow of paint through the axial ports 17, 17*a*.

Figure 2:
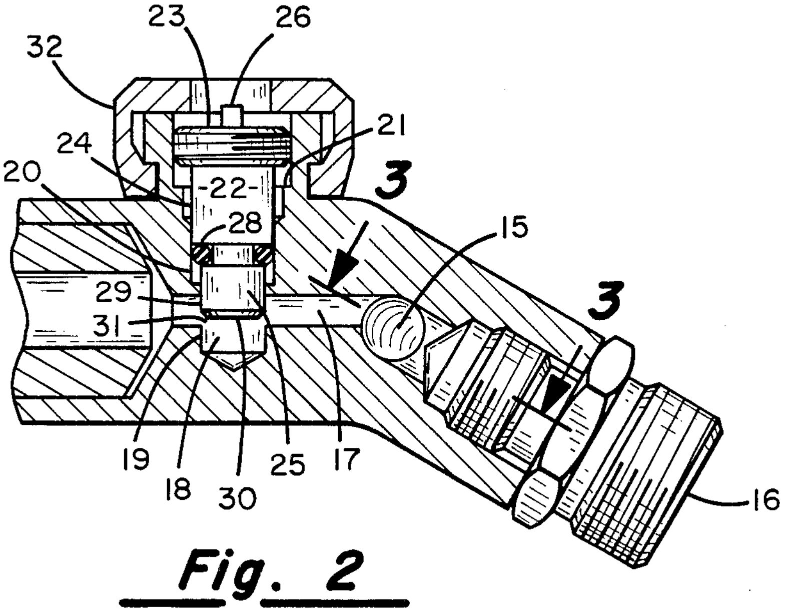
FIG. 2 is a partial longitudinal view of the paint flow controller showing the valve in a partially open position.
Figure 3:
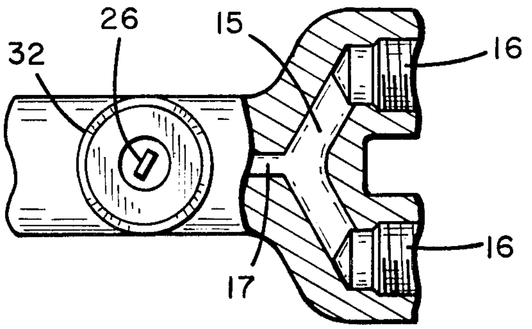
FIG. 3 is a partially cutaway sectional view of the paint flow controller taken along 3—3 of FIG. 2.

When the valve 22 is open, as illustrated in FIG. 2, the annular flow passage 31 increases in size to allow a proportionally greater quantity of material to flow therethrough.

Thus, by turning the valve body 22 the operator may increase or decrease the dimensions of the annular flow passage 31 and quickly and easily adjust the supply of paint to the spray gun.

The present invention may be embodied in other specific forms without departing from its spirit or essential attributes thereof, and it is therefore desired that the present embodiment be considered in all respects as illustrative and not restrictive, reference being made to the appended claims rather than the foregoing description to indicate the scope of the invention.

What is claimed is:

1. In a continuous flow pressure feed paint supply system having a pressure feed recirculating paint system and a paint spray apparatus, a flow dividing paint flow controller comprising (a) an inlet section having a flow through passage coupled between two ports, each port being adapted for connection to a paint system;

(b) a valving section including a longitudinal axial port communicating with the flow through passage and an outwardly extending neck having a cylindrical valve recess extending perpendicular to the axial port from the outer surface through the neck and intersecting and extending past the axial port, the valve recess further having a first diameter through said neck and a smaller valving diameter intersecting the axial port the smaller valving diameter being at least as great as the largest cross section dimension of the axial port, a shoulder is located at the juncture of the first diameter and the valving diameter;

(c) a cylindrical rotary valve adapted to threadedly fit in the valve recess, including a head having external threads and an outwardly extending projection on said head and an inwardly extending cylindrical body, the cylindrical body having a body segment adjacent the threaded head having a diameter to fit the first diameter of said valve recess, the cylindrical body further having a cylindrical valve segment having a tapered end and a seal affixed on the cylindrical body at the junction of the body segment and the valve segment, the seal cooperating with the shoulder at the juncture of the first diameter and the valving diameter when the valve segment is moved to a close position in the valve recess, and the cylindrical valve segment sealingly fitted into the valve recess valving diameter and having a length dimension greater than the largest cross section dimension of the axial port, whereby the tapered end of the valve segment cooperates with the valving diameter of the valve recess forming a variable sized annular flow control passage therethrough in response to movement of the rotary valve; and (d) an outlet section having means for communicating the paint from the axial port to a paint spray apparatus and means for detachably attaching the paint spray apparatus.

2. The flow dividing paint flow controller of claim 1 further comprising a retention means associated with the valving section neck for at least partially enclosing the rotary valve.

3. The flow dividing paint flow controller of claim 2 wherein the retention means further comprises a cap which is attached over the valving section neck.

4. The flow dividing paint flow controller of claim 2 wherein the retention means further comprises a retainer cap attached to the valving section neck concentric with the rotary valve, and having a concentric opening therethrough.

5. The flow dividing paint flow controller of claim 1 wherein the rotary valve further comprises the tapered end tapering centrally from the cylindrical valve segment in an acute angle.

6. The flow dividing paint flow controller of claim 5 wherein and the acute angle is less than 10°.

* * * * *